United States Patent
Huang et al.

(10) Patent No.: US 11,680,653 B2
(45) Date of Patent: Jun. 20, 2023

(54) PRESSURE REDUCING VALVE AND PULL-OUT FAUCET

(71) Applicant: Xiamen Solex High-Tech Industries Co., Ltd., Xiamen (CN)

(72) Inventors: Dingwei Huang, Xiamen (CN); Yicong Xie, Xiamen (CN); Wenjing Xiong, Xiamen (CN); Wenxing Chen, Xiamen (CN)

(73) Assignee: Xiamen Solex High-Tech Industries Co., Ltd., Xiamen (CN)

( * ) Notice: Subject to any disclaimer, the term of this patent is extended or adjusted under 35 U.S.C. 154(b) by 353 days.

(21) Appl. No.: 17/138,997

(22) Filed: Dec. 31, 2020

(65) Prior Publication Data

US 2021/0199208 A1   Jul. 1, 2021

(30) Foreign Application Priority Data

Dec. 31, 2019  (CN) .......................... 201911420996.0

(51) Int. Cl.
*F16K 17/04* (2006.01)
*E03C 1/04* (2006.01)

(52) U.S. Cl.
CPC ............ *F16K 17/04* (2013.01); *E03C 1/0404* (2013.01); *E03C 2001/0415* (2013.01)

(58) Field of Classification Search
CPC . F16K 17/04; E03C 1/0404; E03C 2001/0415
USPC .............................................................. 4/678
See application file for complete search history.

(56) References Cited

U.S. PATENT DOCUMENTS

| 2014/0261718 A1* | 9/2014 | Albrecht ................ F16K 17/04 137/12 |
| 2018/0318849 A1* | 11/2018 | Cao .......................... E03C 1/04 |
| 2018/0372210 A1* | 12/2018 | Poster ................ F16K 37/0041 |

FOREIGN PATENT DOCUMENTS

| CN | 105003702 A | 10/2015 |
| CN | 205715869 U | 11/2016 |

* cited by examiner

*Primary Examiner* — Huyen D Le
(74) *Attorney, Agent, or Firm* — Cooper Legal Group, LLC

(57) ABSTRACT

The present disclosure discloses a pressure reducing valve and a pull-out faucet. The pressure reducing valve comprises a valve body, a piston and an elastic member, the valve body comprises a connector, the connector comprises a water passing hole penetrating from an inner side to an outer peripheral surface of the connector, a sealing member encompasses the connector, the piston comprises a bottom wall and a peripheral wall extending upward from a periphery of the bottom wall, an inner peripheral surface of the peripheral wall comprises a discharging section and a sealed section disposed between the discharging section and the bottom wall, the discharging section defines one or more discharging passages, the peripheral wall of the piston is configured to slidably encompass an outer side of the connector, and the elastic member configured to drive the piston to be separated from the connector.

18 Claims, 6 Drawing Sheets

PRESSURE REDUCING VALVE AND PULL-OUT FAUCET

RELATED APPLICATIONS

This application claims priority to Chinese patent application number 201911420996.0, filed on Dec. 31, 2019. Chinese patent application number 201911420996.0 is incorporated herein by reference.

FIELD OF THE DISCLOSURE

The present disclosure relates to bath and kitchen products, and in particular to a pressure reducing valve and a pull-out faucet.

BACKGROUND OF THE DISCLOSURE

A pressure reducing valve in the technical field of bath and kitchen products, such as disclosed in CN105003702A, typically comprises a valve housing. A valve seat is provided in internal space of the valve housing, and the valve seat has at least one flow passage. The pressure reducing valve comprises a pot-shaped valve body, the valve body overcomes a restoring force to be guided from an open position to move to a closed position. In the closed position, the valve body abuts the valve seat of a valve bracket with its pot-shaped circumferential edge, and the valve body closes at least one passage opening of the at least one flow passage. The pressure reducing valve of this disclosure is characterized that at least one holding sleeve is disposed on the valve bracket or on the valve body, and a holding pin disposed on the valve body or on the valve bracket respectively protrudes into the at least one holding sleeve. In addition, a stop is disposed on an inner circumference of the at least one holding sleeve. The stop and a mating stop on an outer circumference of the holding pin work together so that when the pressure reducing valve in the open position, the stop and the mating stop limit a sliding distance of the valve body relative to the valve bracket. Another example is disclosed in CN205715869U, which describes a pressure regulator valve that belongs to the technical field of valves and solves the technical problems of large volume and poor sensitivity of the prior art. The pressure regulator valve described in CN205715869U comprises a valve body with a water inlet passage and a water outlet passage. The valve body is disposed with a valve seat, an elastic element, and a piston. The piston is sleeved on the valve seat and defines a sealed cavity for mounting the elastic element. A top surface of the piston abuts the valve body, and the valve seat is provided with an overflow passage for connecting the water inlet passage and the water outlet passage. The piston moves axially on the valve seat to adjust an opening of a water outlet on the overflow passage. In the above two technical solutions, an inner peripheral surface of a peripheral wall of the piston is a closed section. When the peripheral wall acts on a seal ring, a sudden deformation of the seal ring subjected by a force results in uneven force on the seal ring, which is easily squeezed out by the peripheral wall and leakage happens.

BRIEF SUMMARY OF THE DISCLOSURE

The present disclosure provides a pressure reducing valve and a pull-out faucet to solve deficiencies of the conventional pressure reducing valve in the background.

In order to solve the technical problems, a first technical solution of the present disclosure is as follows.

A pressure reducing valve comprises a valve body, a piston and an elastic member, the valve body comprises a connector, the connector comprises a water passing hole penetrating from an inner side to an outer peripheral surface of the connector, a sealing member encompasses an outer side of the connector, the piston comprises a bottom wall and a peripheral wall extending upward from a periphery of the bottom wall, an inner peripheral surface of the peripheral wall comprises a discharging section and a sealed section disposed between the discharging section and the bottom wall, the discharging section defines one or more discharging passages, the peripheral wall of the piston is configured to slidably encompass the outer side of the connector, the peripheral wall slides relative to the connector to control the sealed section to cooperate with the sealing member to control the water passing holes to discharge water, and the elastic member acts on the piston to generate an elastic force configured to drive the piston to be separated from the connector.

In an embodiment, a sealed cavity is defined between the piston and the connector, and the connector comprises an air flow passage in communication with an external environment and the sealed cavity.

In an embodiment, the discharging section is disposed on an end portion of the inner peripheral surface of the peripheral wall, and the one or more discharging passages penetrate an end surface of the peripheral wall.

In an embodiment, the one or more discharging passages penetrate an inner side and an outer side of the peripheral wall.

In an embodiment, the one or more discharging passages define one or more through grooves penetrating an inner side and an outer side of the peripheral wall, and the one or more through grooves penetrate an end surface of the peripheral wall.

In an embodiment, the one or more discharging passages define one or more give-way grooves extending inward from the inner peripheral surface of the peripheral wall, and the one or more give-way grooves penetrate an end surface of the peripheral wall.

In an embodiment, an end of the inner peripheral surface of the peripheral wall defines a guiding tapered surface.

In an embodiment, the discharging section is concave to define a plurality of discharging passages of the one or more discharging passages circumferentially and evenly disposed at intervals.

In an embodiment, the peripheral wall of the piston upwardly encompasses the outer side of the connector, and the sealing member is disposed above the water passing hole.

In an embodiment, the outer side of the connector is concave to define an annular groove, and the sealing member is disposed in the annular groove.

In an embodiment, an outer side of the piston is secured with one or more first positioning portions, the outer side of the connector protrudes to define a second positioning portion, the elastic member encompasses the connector and the piston, and the elastic member abuts and is disposed between the one or more first positioning portions and the second positioning portion.

In an embodiment, the second positioning portion is disposed above the sealing member.

In an embodiment, the valve body comprises a valve housing, the connector is secured in the valve housing, and a water outlet passage in communication with the water passing hole is defined between an outer side of the piston and an inner peripheral surface of the valve housing.

In an embodiment, the inner peripheral surface of the valve housing protrudes to define a protrusion ring, the outer side of the piston is secured with the one or more first positioning portions configured to be abutted by the elastic member, and the protrusion ring is configured to cooperate with the one or more first positioning portions to limit a furthest sliding position of the piston.

In an embodiment, the connector is concave to define a water inlet passage, and the water passing hole is in communication with the water inlet passage.

In order to solve the technical problems, a second technical solution of the present disclosure is as follows.

A pull-out faucet comprises a water outlet terminal, a hose and a pressure reducing valve, an inner side of the hose comprises a first water passage and a second water passage, the water outlet terminal comprises two water outlets and a control mechanism, the hose is connected to the water outlet terminal, the first water passage and the second water passage are respectively in communication with the two water outlets, the control mechanism is configured to control the second water passage to be opened and to be closed, and the pressure reducing valve is connected to the hose and is used in conjunction with the second water passage.

In an embodiment, the hose has a pipe-in-pipe structure and comprises an inner pipe and an outer pipe, the second water passage is disposed in the inner pipe, and the first water passage is defined between the inner pipe and the outer pipe.

In an embodiment, the pressure reducing valve comprises a housing, a valve body, a piston and an elastic member, the valve body comprises a connector and a valve housing, the connector is secured in the valve housing, the valve body is disposed in the housing, a first communication passage is defined between the housing and the valve housing to define a part of the first water passage, the connector comprises a water passing hole penetrating from an inner side to an outer peripheral surface of the connector, the piston slidably encompasses an outer side of the connector, the piston slides relative to the connector to control the water passing hole to discharge water, the elastic member acts on the piston to generate an elastic force configured to drive the piston to be separated from the connector, a water outlet passage in communication with the water passing hole is defined between an outer side of the piston and an inner peripheral surface of the valve housing, and the second water passage comprises the water passing hole and the water outlet passage.

Compared with the existing techniques, the technical solution has the following advantages.

The discharging section of the peripheral wall of the piston comprises one or more discharging passages. After the pressure from the rear end increases (for example, the water passage of the rear end is suddenly closed), the piston slides upward, the peripheral wall slides upward, the water from the water passing hole can flow out of the one or more discharging passages, and the one or more discharging passages continue to discharge water, so as to prevent the water passing hole from being suddenly and completely closed, there will not be a pressure mutation of a portion of the seal ring that results in the seal ring being deformed and being squeezed out, the seal ring is prevented from being squeezed out, and the seal ring is prevented from moving. The piston continues to slide upward to the top until the pressure from the rear end is greater than the elastic value of the elastic member. The sealed section of the peripheral wall is hermetically disposed on the seal ring to achieve a complete seal, and the pressure from the rear end is constant.

As the pressure reducing valve is disposed on the second water passage of the hose, a control mechanism can be directly disposed on the water outlet terminal to control the second water passage to be opened and to be closed. Two water passages can discharge water from the same water outlet terminal, the appearance of the faucet is beautiful, and the control is convenient.

BRIEF DESCRIPTION OF THE DRAWINGS

The present disclosure will be further described below in combination with the accompanying drawings and embodiments.

Figure 1:
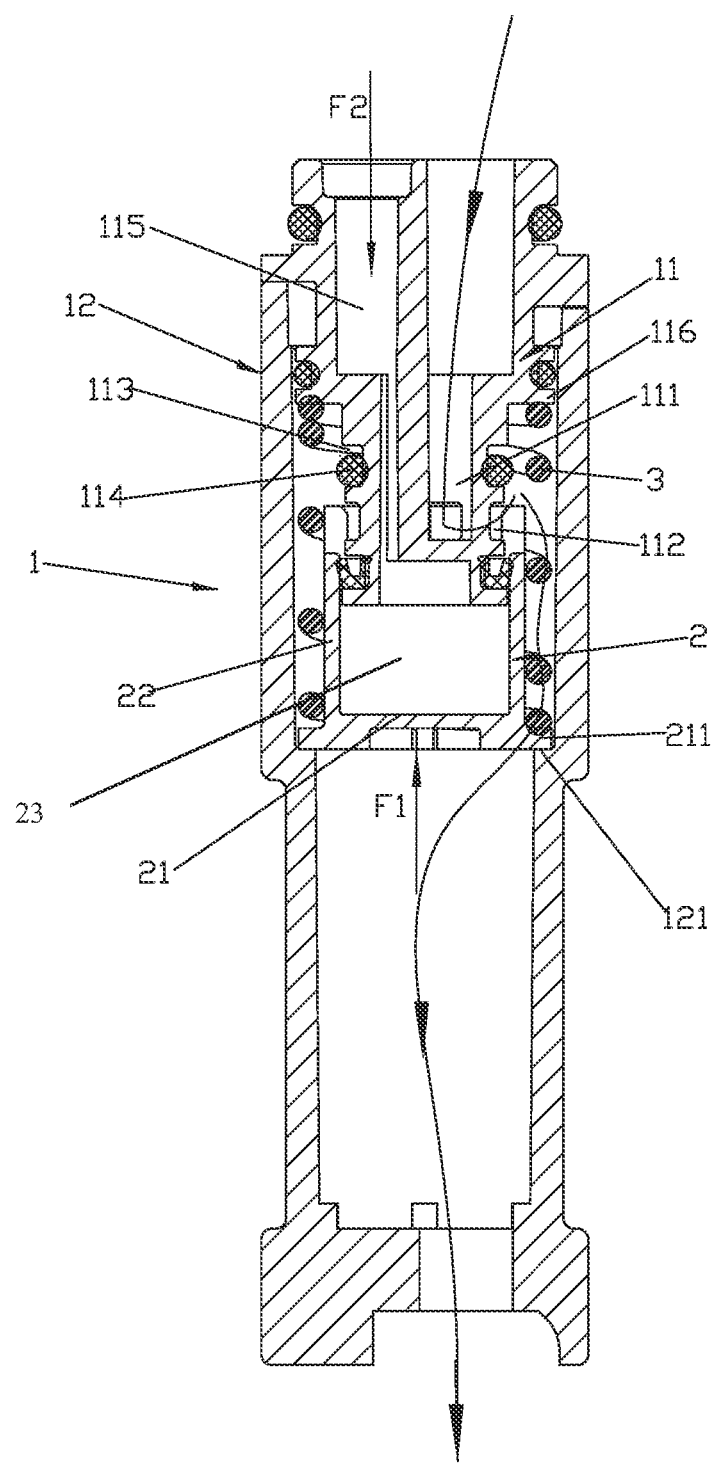
FIG. 1 is a schematic view of a structure of a pressure reducing valve of Embodiment 1.

Reference numbers: valve body 1, piston 2, elastic member 3, connector 11, valve housing 12, water inlet passage 111, water passing hole 112, annular groove 113, seal ring 114, air flow passage 115, second positioning portion 116, protrusion ring 121, bottom wall 21, peripheral wall 22, one or more first positioning portions 211, discharging section 221, sealed section 222, one or more discharging passages 223, guiding tapered surface 224, sealed cavity 23, faucet body 4, water outlet terminal 5, hose 6, pressure reducing valve 7, control mechanism 51, housing 71, and first communication passage 72, first water passage 81, second water passage 82, one or more discharging passages 223', and one or more discharging passages 223".

DETAILED DESCRIPTION OF THE EMBODIMENTS

Embodiment 1

Figure 2:
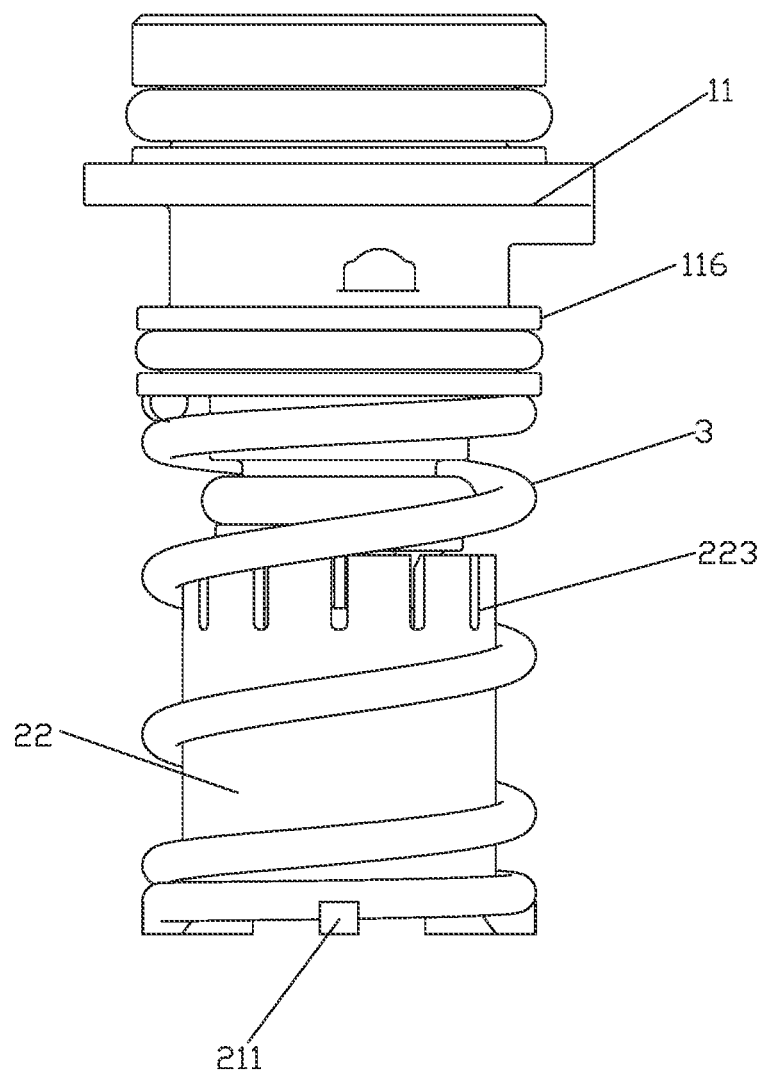
FIG. 2 is a schematic view of a structure assembled together with a connector, a piston, and an elastic member of the pressure reducing valve of Embodiment 1.
Figure 3:
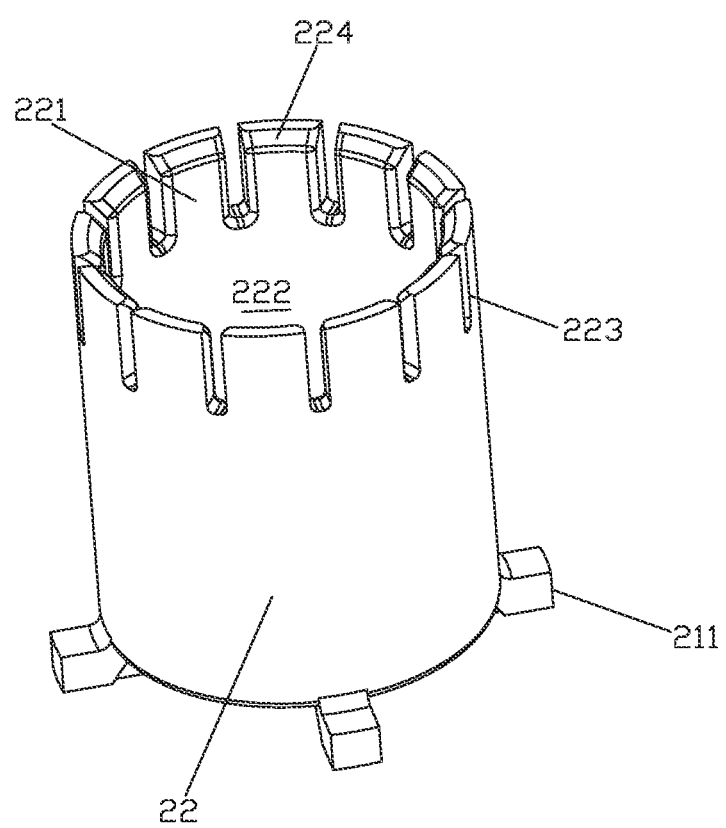
FIG. 3 is a perspective view of the piston of the pressure reducing valve of Embodiment 1.

Referring to FIGS. 1-3, a pressure reducing valve comprises a valve body 1, a piston 2, and an elastic member 3.

The valve body 1 comprises a connector 11 and a valve housing 12. An inner side (i.e., an inner peripheral surface) of the valve housing 12 protrudes to define a protrusion ring 121, and the connector 11 is secured in the valve housing 12. A top end surface of the connector 11 is concave to define a water inlet passage 111 in communication with a water supply source. The connector 11 further comprises a plurality of water passing holes 112 penetrating from an inner side to an outer side of the water inlet passage 111 (i.e., the plurality of water passing holes 112 are in communication with the water inlet passage 111). The plurality of water passing holes 112 are annularly arrayed. The plurality of water passing holes 112 penetrate from the water inlet passage 111 disposed in the connector 11 to an outer peripheral surface of the connector 11. The outer peripheral surface (i.e., an outer side) of the connector 11 is concave to define an annular groove 113. The annular groove 113 is disposed above the plurality of water passing holes 112. A sealing member is disposed in the annular groove 113 (i.e., the sealing member encompasses the outer side of the connector 11, and the sealing member is disposed above the plurality of water passing holes 112), and the sealing member defines a seal ring 114. An outer periphery of the connector 11 is disposed with an annular surface facing downward, the annular surface defines a second positioning portion 116 (i.e., the outer side of the connector 11 protrudes to define a second positioning portion 116), and the second positioning portion 116 is disposed above the seal ring 114.

The piston 2 comprises a bottom wall 21 and a peripheral wall 22 extending upward from a periphery of the bottom wall 21. An inner peripheral surface of the peripheral wall 22 comprises a discharging section 221 disposed on an end portion of the peripheral wall 22 and a sealed section 222 disposed between the discharging section 221 and the bottom wall 21. The discharging section 221 is concave to define one or more discharging passages 223, and the one or more discharging passages 223 penetrate an end surface of the peripheral wall 22. In this embodiment, the one or more discharging passages 223 define through grooves that penetrate an inner side and an outer side of the peripheral wall 22, and the through grooves penetrate the end surface of the peripheral wall 22. The discharging section 221 is concave to define a plurality of discharging passages 223 of the one or more discharging passages 223 circumferentially and evenly disposed at intervals. An end of the inner peripheral surface of the peripheral wall 22 defines a guiding tapered surface 224. One or more first positioning portions 211 protrude from an outer side of the bottom wall 21 (i.e., an outer side of the piston 2 is secured with one or more first positioning portions 211 configured to be abutted by the elastic member), and the one or more first positioning portions 211 are, for example, lugs.

The peripheral wall 22 of the piston 2 is configured to slidably and upwardly encompass the outer side of the connector 11. A sealed cavity 23 is defined between the piston 2 and the connector 11, and the connector 11 comprises an air flow passage 115 in communication with an external environment and the sealed cavity 23. The elastic member 3 encompasses the connector 11 and the piston 2 and abuts and is disposed between the one or more first positioning portions 211 and the second positioning portion 116. The one or more first positioning portions 211 are disposed above the protrusion ring 121 of the valve housing 12, and the protrusion ring 121 is configured to cooperate with the one or more first positioning portions 211 to limit a furthest sliding position of the piston 2 and limit a furthest downward sliding distance. In this embodiment, a water outlet passage in communication with the plurality of water passing holes 112 is defined between an outer side of the piston 2 and an inner peripheral surface of the valve housing 12, and water from the water outlet passage flows downward through an interval between every two first positioning portions 211 of the one or more first positioning portions 211. As needed, the elastic member 3 can also be disposed between the piston 2 and the valve housing 12. When water pressure from a rear end of the elastic member 3 increases, the elastic member 3 can generate a buffering function and prevent water passage from being closed by the piston 2. When the water is cut off, an elastic force of the elastic member 3 drives the piston 2 to be reset and the water passage to be opened (i.e., the elastic member acts on the piston 2 to generate an elastic force configured to drive the piston 2 to be separated from the connector 11).

The peripheral wall 22 of the piston 2 upwardly and slidably encompasses the outer side of the connector 11, and the peripheral wall 22 slides relative to the connector 11 to control the sealed section 222 to cooperate with the seal ring 114 to control water outflow from the plurality of water passing holes 112. In one embodiment, the elastic member 3 is a spring, and a setting principle of a force value of the spring is as follows. When water flows though the water passage, the water pressure of the water passage at a front end and the rear end is equal, there is an area difference between a top area and a bottom area of the piston 2 (the bottom area of the piston 2 is much larger than the top area). When the pressure at the rear end reaches a preset range greater than the force value of the spring, the piston 2 is pushed to finally close the entire water passage, and the pressure at the rear end is kept constant within the pressure range of the spring force. According to the formula $F=P*S$ (F for force value, P for pressure, and S for area difference), when the pressure at the rear end F1 is greater than the force value F plus atmospheric pressure F2 ($F1>F+F2$), the piston 2 starts to move up to adjust the pressure at the rear end, and the pressure at the rear end is kept constant at no more than a predetermined value as the pressure changes (for example, 0.8 MPA) to protect equipment or pipes of the rear water passage.

The discharging section 221 of the peripheral wall 22 of the piston 2 comprises the one or more discharging passages 223, and the one or more discharging passages 223 define the through grooves that penetrate the inner side and the outer side of the peripheral wall 22, so that an upper end of the peripheral wall 22 of the piston 2 defines a sieve-like structure. After the pressure at the rear end increases (i.e., the water passage of the rear end is suddenly closed), the piston 2 slides upward, the peripheral wall 22 slides upward, the sieve-like structure of the peripheral wall 22 enables water from the plurality of water passing holes 112 to flow from the one or more discharging passages 223, and the one or more discharging passages 223 continue to discharge water to prevent the plurality of water passing holes 112 from being suddenly completely closed. Therefore, there will not be a pressure mutation of a portion of the seal ring 114 that results in the seal ring 114 being deformed and being squeezed out. Thus, the aforementioned structure can prevent the seal ring 114 from being squeezed out and enable the seal ring 114 to be hermetically locked in the annular groove 113. When the pressure at the rear end is greater than the force value of spring, the piston 2 continues to slide upward to a top. The sealed section 222 is hermetically disposed on the seal ring 114 to achieve a complete seal, and the pressure at the rear end is constant.

As needed, the valve housing 12 comprises a joint. The joint defines the connector 11. The joint further comprises a protruding portion protruding out of the connector 11, and the protruding portion abuts an upper end opening of the valve housing 12.

Figure 4:
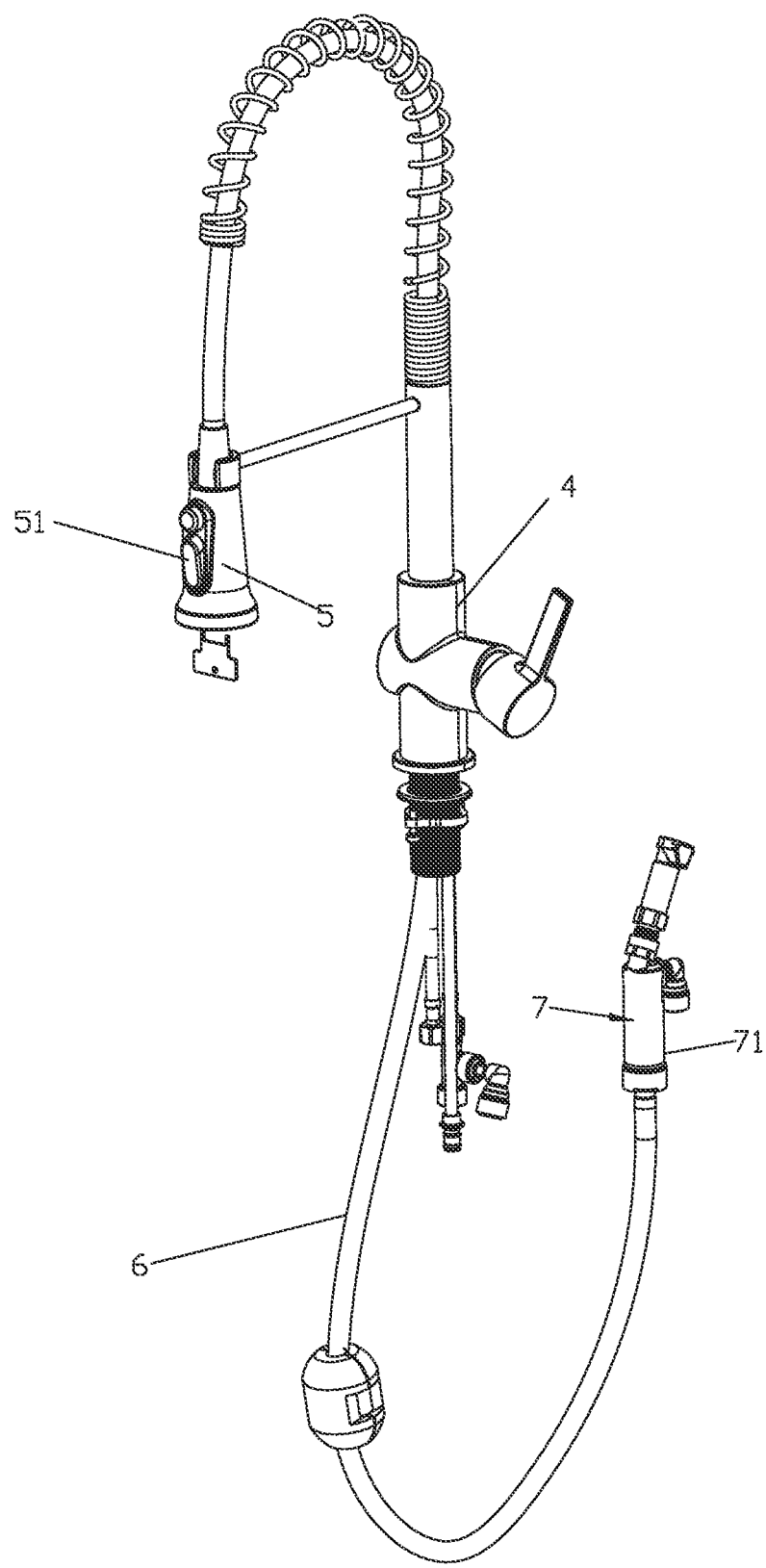
FIG. 4 is a perspective view of the pressure reducing valve of Embodiment 1 when the pressure reducing valve is applied to a pull-out faucet.
Figure 5:
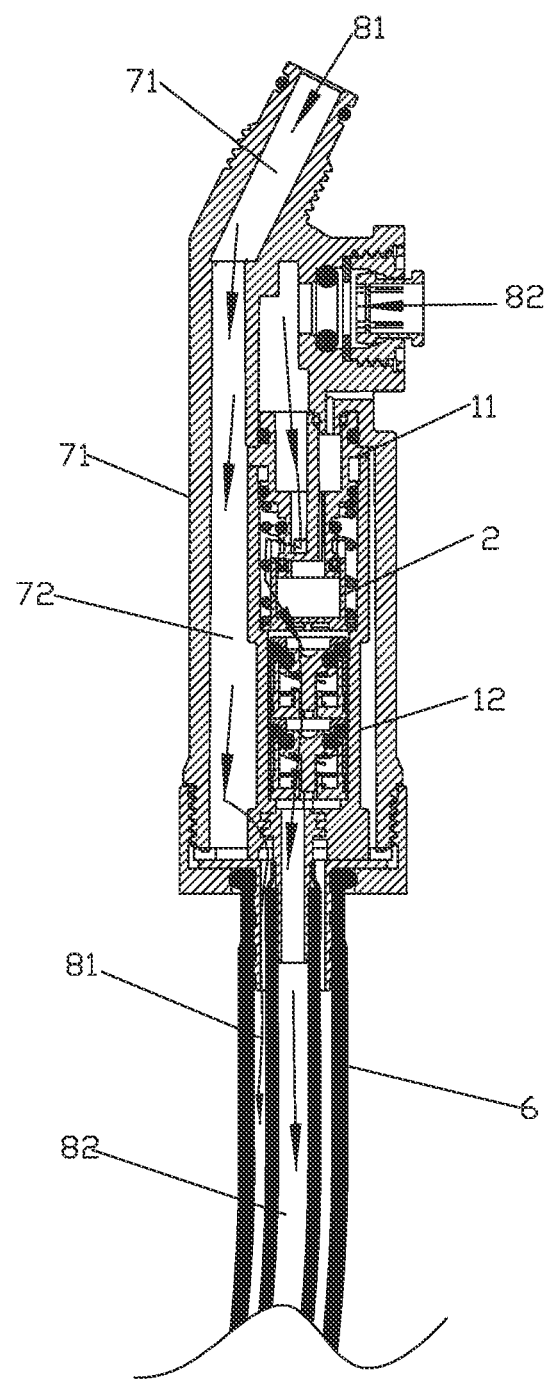
FIG. 5 is a cross-sectional view of the pressure reducing valve of Embodiment 1 when the pressure reducing valve is applied to the pull-out faucet.

Referring to FIGS. 4 and 5, FIGS. 4 and 5 illustrate schematic views of an application of the pressure reducing valve applied to a pull-out faucet. The pull-out faucet comprises a faucet body 4, a water outlet terminal 5, a hose 6, and a pressure reducing valve 7. The water outlet terminal 5 comprises two water outlets and a control mechanism 51. The hose 6 is a pipe-in-pipe structure comprising an inner pipe and an outer pipe. A second water passage 82 is disposed in the inner pipe, and a first water passage 81 is defined between the inner pipe and the outer pipe. The hose 6 passes through the faucet body 4. A first end of the hose 6 is connected to the water outlet terminal 5, and the first water passage 81 and the second water passage 82 are respectively in communication with the two water outlets. The control mechanism 51 is configured to control the second water passage 82 to be opened and to be closed. The pressure reducing valve 7 is connected to the hose 6 and is used in conjunction with the second water passage 82. In this embodiment, the first water passage 81 is a conventional water passage, and the second water passage 82 is a purified water passage.

In a specific structure, the pressure reducing valve 7 comprises a housing 71, the valve body 1, the piston 2, and the elastic member 3. The valve body 1 comprises the connector 11 and the valve housing 12. The valve body 1 is disposed in the housing 71, and a first communication passage 72 is defined between the housing 71 and the valve housing 12 to define a part of the first water passage 81. The second water passage 82 comprises the plurality of water passing holes 112 and the water outlet passage. The pressure reducing valve 7 and the pipe-in-pipe structure are designed as an integral structure (water flows from the top, and the piston 2 moves upward and downward to control an amount of water flow and the pressure at the rear end with a change of the pressure at the rear end. When the pressure at the rear end is too high or greater than a preset force value of the spring (i.e., the force value of the spring), the water passing passage is completely closed. Therefore, a water pressure at the rear end remains at a pressure slightly greater than a pressure equal to the force value of the spring and remains at a constant pressure).

In the pull-out faucet of this embodiment, since the pressure reducing valve 7 is disposed on the purified water passage of the hose 6, therefore, the control mechanism 51 can be directly disposed on the water outlet terminal 5 to control the second water passage 82 (the conventional hose is not disposed with the pressure reducing valve and thus, for example, when the second water passage is directly closed on the water outlet terminal, the water pressure in the hose and the water outlet terminal will continue to increase in a situation where a front end is not closed, resulting in a possibility that the hose and the water outlet terminal are damaged. Therefore, the second water passage in the existing techniques is mostly controlled by a valve at the front end. The purified water passage and the conventional water passage have separate water outlets, an occupied space is larger, an appearance of the faucet is not good, and integral water discharging of the pull-out pipe-in-pipe structure cannot be achieved). The purified water and the conventional water can discharge water from the same shower (because two water passages can be directly controlled at the water outlet terminal, so water can flow out of the same shower), the faucet body only maintains one switch configured to control, and an appearance design of the faucet is beautiful (the purified water and the conventional water is not configured to be discharged separately or to be controlled by independent handles). In the pull-out faucet of this embodiment, since the pressure reducing valve 7 is disposed on the purified water passage of the hose 6, the pressure reducing valve 7 adopts the aforementioned structure, so the pressure reducing valve 7 can withstand a high pressure (i.e., a pressure of 3.5 MPa) and the pressure at the rear end can be controlled to a minimum value.

Embodiment 2

Figure 6:
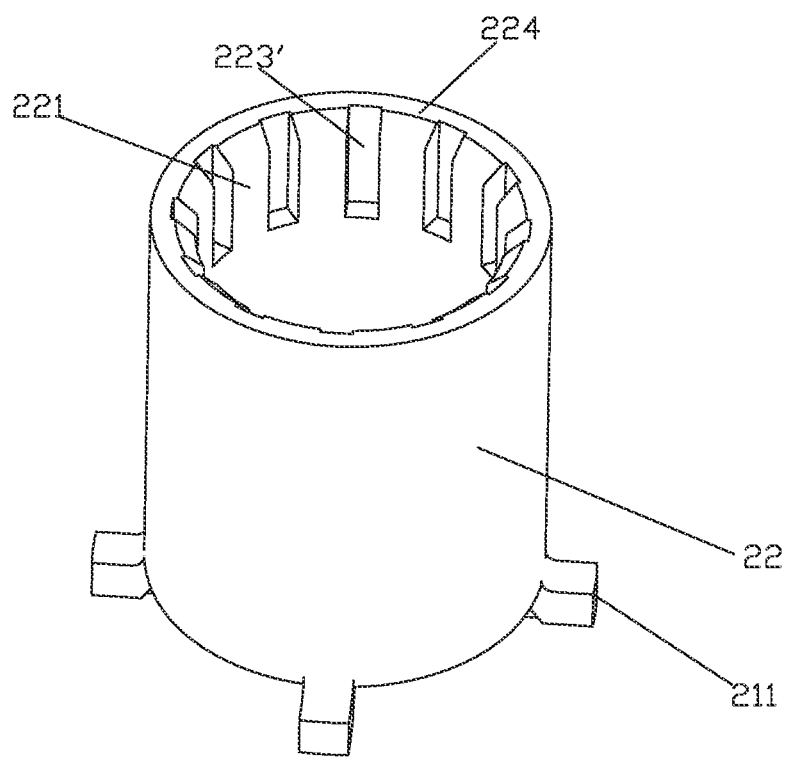
FIG. 6 is a perspective view of a piston of a pressure reducing valve of Embodiment 2.

Referring to FIG. 6, this embodiment differs from Embodiment 1 in that the one or more discharging passages 223' define one or more give-way grooves extending inward from the inner peripheral surface of the peripheral wall 22, and the one or more give-way grooves penetrate the end surface of the peripheral wall 22.

Embodiment 3

Figure 7:
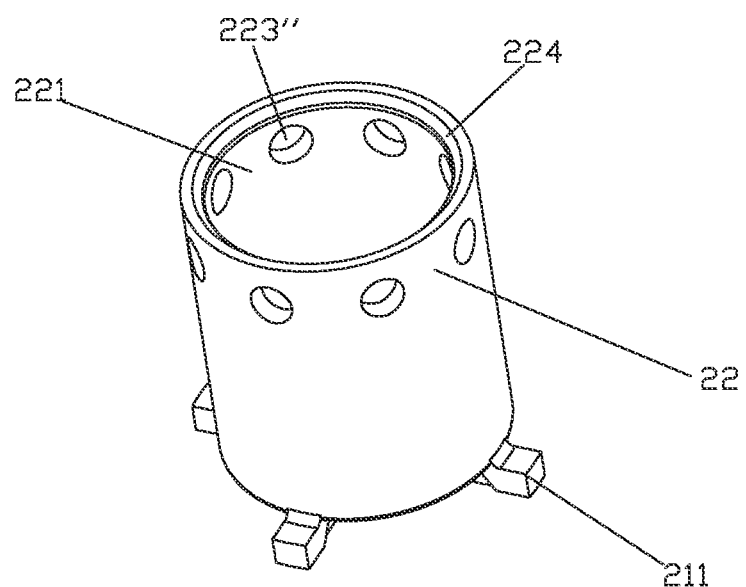
FIG. 7 is a perspective view of a piston of a pressure reducing valve of Embodiment 3.

Referring to FIG. 7, this embodiment differs from Embodiment 1 in that the one or more discharging passages 223" define one or more through grooves penetrating the inner side and the outer side of the peripheral wall 22. The one or more through grooves do not penetrate to the end surface of the peripheral wall 22, and an annular part corresponding with an inner port of the through groove defines the discharging section 221.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A pressure reducing valve, comprising:
   a valve body,
   a piston, and
   an elastic member, wherein:
      the valve body comprises a connector,
      the connector comprises a water passing hole penetrating from an inner side to an outer peripheral surface of the connector,
      a sealing member encompasses an outer side of the connector,
      the piston comprises a bottom wall and a peripheral wall extending upward from a periphery of the bottom wall,
      an inner peripheral surface of the peripheral wall comprises a discharging section and a sealed section disposed between the discharging section and the bottom wall,
      the discharging section defines one or more discharging passages,
      the peripheral wall of the piston is configured to slidably encompass the outer side of the connector,
      the peripheral wall slides relative to the connector to control the sealed section to cooperate with the sealing member to control the water passing hole to discharge water, and
      the elastic member acts on the piston to generate an elastic force configured to drive the piston to be separated from the connector.

2. The pressure reducing valve according to claim 1, wherein:
   a sealed cavity is defined between the piston and the connector, and
   the connector comprises an air flow passage in communication with an external environment and the sealed cavity.

3. The pressure reducing valve according to claim 1, wherein:
   the discharging section is disposed on an end portion of the inner peripheral surface of the peripheral wall, and
   the one or more discharging passages penetrate an end surface of the peripheral wall.

4. The pressure reducing valve according to claim 1, wherein the one or more discharging passages penetrate an inner side and an outer side of the peripheral wall.

5. The pressure reducing valve according to claim 1, wherein:
the one or more discharging passages define one or more through grooves penetrating an inner side and an outer side of the peripheral wall, and
the one or more through grooves penetrate an end surface of the peripheral wall.

6. The pressure reducing valve according to claim 1, wherein:
the one or more discharging passages define one or more give-way grooves extending inward from the inner peripheral surface of the peripheral wall, and
the one or more give-way grooves penetrate an end surface of the peripheral wall.

7. The pressure reducing valve according to claim 1, wherein an end of the inner peripheral surface of the peripheral wall defines a guiding tapered surface.

8. The pressure reducing valve according to claim 7, wherein:
an outer side of the piston is secured with one or more first positioning portions,
the outer side of the connector protrudes to define a second positioning portion,
the elastic member encompasses the connector and the piston, and
the elastic member abuts and is disposed between the one or more first positioning portions and the second positioning portion.

9. The pressure reducing valve according to claim 8, wherein the second positioning portion is disposed above the sealing member.

10. The pressure reducing valve according to claim 1, wherein the discharging section is concave to define a plurality of discharging passages of the one or more discharging passages circumferentially and evenly disposed at intervals.

11. The pressure reducing valve according to claim 1, wherein:
the peripheral wall of the piston upwardly encompasses the outer side of the connector, and
the sealing member is disposed above the water passing hole.

12. The pressure reducing valve according to claim 11, wherein:
the outer side of the connector is concave to define an annular groove, and
the sealing member is disposed in the annular groove.

13. The pressure reducing valve according to claim 1, wherein:
the valve body comprises a valve housing,
the connector is secured in the valve housing, and
a water outlet passage in communication with the water passing hole is defined between an outer side of the piston and an inner peripheral surface of the valve housing.

14. The pressure reducing valve according to claim 13, wherein:
the inner peripheral surface of the valve housing protrudes to define a protrusion ring,
the outer side of the piston is secured with one or more first positioning portions configured to be abutted by the elastic member, and
the protrusion ring is configured to cooperate with the one or more first positioning portions to limit a furthest sliding position of the piston.

15. The pressure reducing valve according to claim 1, wherein:
the connector is concave to define a water inlet passage, and
the water passing hole is in communication with the water inlet passage.

16. A pull-out faucet, comprising:
a water outlet terminal,
a hose, and
a pressure reducing valve, wherein:
an inner side of the hose comprises a first water passage and a second water passage,
the water outlet terminal comprises two water outlets and a control mechanism,
the hose is connected to the water outlet terminal,
the first water passage and the second water passage are respectively in communication with the two water outlets,
the control mechanism is configured to control the second water passage to be opened and to be closed, and
the pressure reducing valve is connected to the hose and is used in conjunction with the second water passage.

17. The pull-out faucet according to claim 16, wherein:
the hose has a pipe-in-pipe structure and comprises an inner pipe and an outer pipe,
the second water passage is disposed in the inner pipe, and
the first water passage is defined between the inner pipe and the outer pipe.

18. The pull-out faucet according to claim 17, wherein:
the pressure reducing valve comprises a housing, a valve body, a piston, and an elastic member,
the valve body comprises a connector and a valve housing,
the connector is secured in the valve housing,
the valve body is disposed in the housing,
a first communication passage is defined between the housing and the valve housing to define a part of the first water passage,
the connector comprises a water passing hole penetrating from an inner side to an outer peripheral surface of the connector,
the piston slidably encompasses an outer side of the connector,
the piston slides relative to the connector to control the water passing hole to discharge water,
the elastic member acts on the piston to generate an elastic force configured to drive the piston to be separated from the connector,
a water outlet passage in communication with the water passing hole is defined between an outer side of the piston and an inner peripheral surface of the valve housing, and
the second water passage comprises the water passing hole and the water outlet passage.

* * * * *